US009775429B2

(12) United States Patent
Gravelle et al.

(10) Patent No.: US 9,775,429 B2
(45) Date of Patent: Oct. 3, 2017

(54) ICE SCRAPER/BRUSH WITH COVER

(71) Applicants: Jeffrey Gravelle, Westport, CT (US); Jason Gravel, Brookside, NJ (US)

(72) Inventors: Jeffrey Gravelle, Westport, CT (US); Jason Gravel, Brookside, NJ (US)

( * ) Notice: Subject to any disclaimer, the term of this patent is extended or adjusted under 35 U.S.C. 154(b) by 0 days.

(21) Appl. No.: 14/802,568

(22) Filed: Jul. 17, 2015

(65) Prior Publication Data

US 2016/0015166 A1    Jan. 21, 2016

Related U.S. Application Data

(60) Provisional application No. 62/026,111, filed on Jul. 18, 2014.

(51) Int. Cl.
| A46B 15/00 | (2006.01) |
| A46B 17/04 | (2006.01) |
| A47L 1/06 | (2006.01) |
| A47L 13/08 | (2006.01) |
| B60S 3/04 | (2006.01) |
| A47L 13/022 | (2006.01) |

(52) U.S. Cl.
CPC ...... *A46B 15/0081* (2013.01); *A46B 15/0095* (2013.01); *A46B 17/04* (2013.01); *A47L 1/06* (2013.01); *A47L 13/022* (2013.01); *A47L 13/08* (2013.01); *B60S 3/045* (2013.01)

(58) Field of Classification Search
CPC . B60S 3/045; A46B 15/0081; A46B 15/0095; A46B 17/04; A47L 13/02; A47L 13/022; A47L 13/06; A47L 13/08; B44D 3/162; B44D 3/164

USPC ............. 15/111, 114, 117, 184, 236.02, 246, 15/248.1, 236.01; 206/207, 209, 209.1, 206/349, 361, 362.2, 362.3, 15.2, 15.3
See application file for complete search history.

(56) References Cited

U.S. PATENT DOCUMENTS

| 2,533,838 | A | * | 12/1950 | Ranft | A46B 15/00 15/111 |
| 3,116,502 | A | * | 1/1964 | Gerber | B60S 3/045 15/105 |
| 4,517,700 | A | * | 5/1985 | Pinto | B05C 17/00 15/105 |
| 4,538,320 | A | | 9/1985 | Batt | 15/236 R |
| 4,683,592 | A | | 8/1987 | Strongwater | 2/17 |
| 4,870,712 | A | | 10/1989 | Markus | 15/227 |

(Continued)

*Primary Examiner* — Mark Spisich
(74) *Attorney, Agent, or Firm* — Ostrolenk Faber LLP

(57) ABSTRACT

An ice scraper blade and/or brush mounted to a handle which has an anatomically designed grip. Attached to the handle is a cover to protect the user's hand from snow, ice, water, and cold. The cover has a sleeve with a first side made of waterproof fabric and a second side which is insulated with a suitable thermo-insulating fabric. In a first position of the cover, the first side of the sleeve is exposed to the outside for protecting the user's hand against the elements. In a second position of the cover, the sleeve is reversed so that the first side of the sleeve is on the inside, for enclosing ice, water and snow that may be adhered to the ice scraper blade and/or brush. The cover is also provided with a fastening arrangement that is placed at the second end of the sleeve, which prevents entering of snow and ice into the cover in the first position, and which contains the ice, water and snow inside the cover in the second position.

10 Claims, 2 Drawing Sheets

(56) References Cited

U.S. PATENT DOCUMENTS

| | | | | |
|---|---|---|---|---|
| 6,125,493 A | * | 10/2000 | Daw | A41D 13/085 |
| | | | | 15/111 |
| 6,757,930 B2 | | 7/2004 | Kajgana | 15/111 |
| 2005/0145518 A1 | * | 7/2005 | Hong | B44D 3/123 |
| | | | | 206/361 |
| 2005/0241097 A1 | * | 11/2005 | Nennig | A46B 11/0079 |
| | | | | 15/248.1 |

* cited by examiner

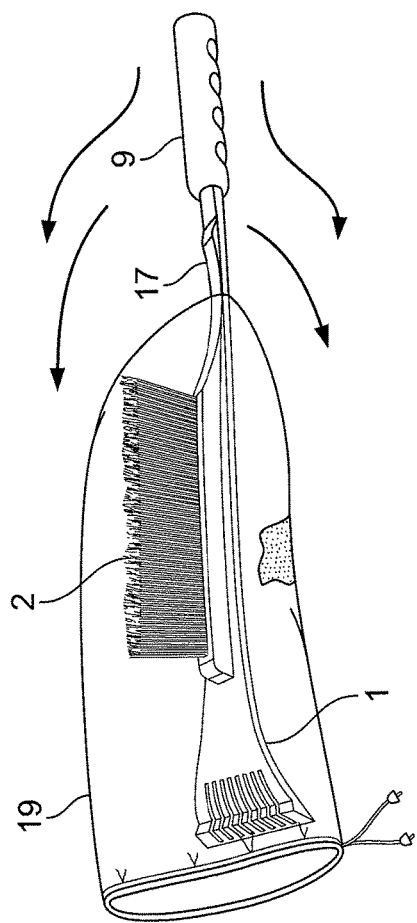
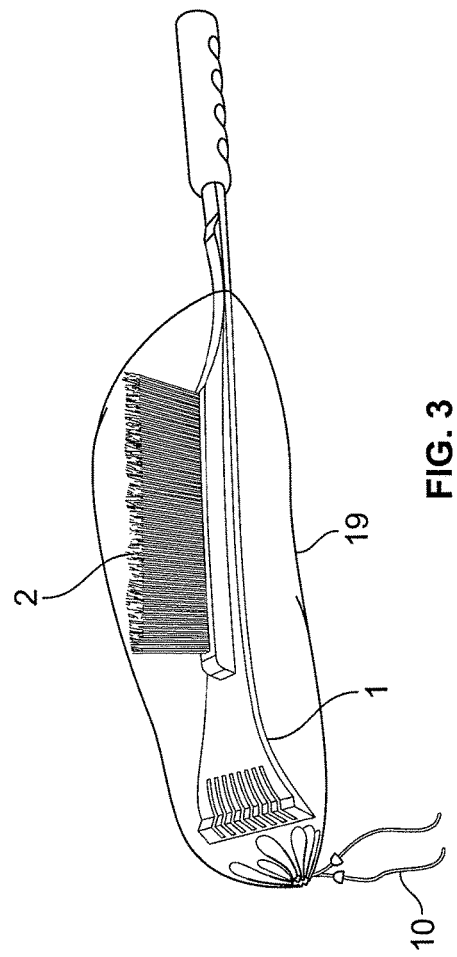
FIG. 2
FIG. 3

ICE SCRAPER/BRUSH WITH COVER

CROSS REFERENCE TO RELATED APPLICATION

The present non-provisional patent application claims the benefit of priority from U.S. Provisional Patent Application No. 62/026,111, filed Jul. 18, 2014, the entire contents of which are incorporated herein by reference.

BACKGROUND

An ice scraper/brush combination for removing ice and snow from a windshield of a vehicle, having a handle, and a cover for protecting the user's hand from the elements, the cover being reversible for being folded over and enclosing the scraper and the brush after use.

Prior ice scraper/brush combinations with covers for keeping the user's hand warm and dry are known from U.S. Pat. Nos. 6,757,930; 4,870,712; 4,683,592; and 4,538,320.

An unsolved problem with these prior concepts is that after use, the scraper/brush (hereinafter the "scraper") is wet, and snow and ice are often still adhered to it. The scraper is also cold, which causes condensation after the device is brought inside the vehicle after use. The snow, ice and condensation lead to an undesirable wet condition inside the vehicle.

SUMMARY

To solve this problem, the cover is configured with a suitable shape and size to be reversible after use, to be drawn from a first position enclosing the handle to a second position enclosing the scraper and/or brush, to contain any remaining snow and ice.

The ice scraper/brush includes a preferably flexible sleeve-shaped cover enclosing a handle. The cover extends over the length of the handle to protect the user's hand from the weather while the user holds the handle.

A first end of the cover is secured near the junction of the front end of the grip and the portion of the handle holding the scraper and/or brush.

A second end of the cover is preferably provided with a drawstring, hook-and-loop fastener strips, or another fastening arrangement. Thus the cover provides better protection for the user's hand when in use, in the first position. In the second position, the cover is reversed so as to enclose the snow and ice remaining on the scraper after use.

The cover is preferably made of a waterproof material on a first side (on the outside when in use covering the grip), and a thermal insulating material on a second side (on the inside when in use covering the grip).

The above-mentioned objects and features will become more apparent from the following drawings and descriptions.

BRIEF DESCRIPTION OF THE DRAWINGS

FIG. 2 is a side view showing the cover in its second position enclosing the ice scraper and brush; and FIG. 3 is a side view shown with the open end of the cover being secured with a drawstring to tightly enclose the scraper and brush.

DETAILED DESCRIPTION OF AN EMBODIMENT

Figure 1:
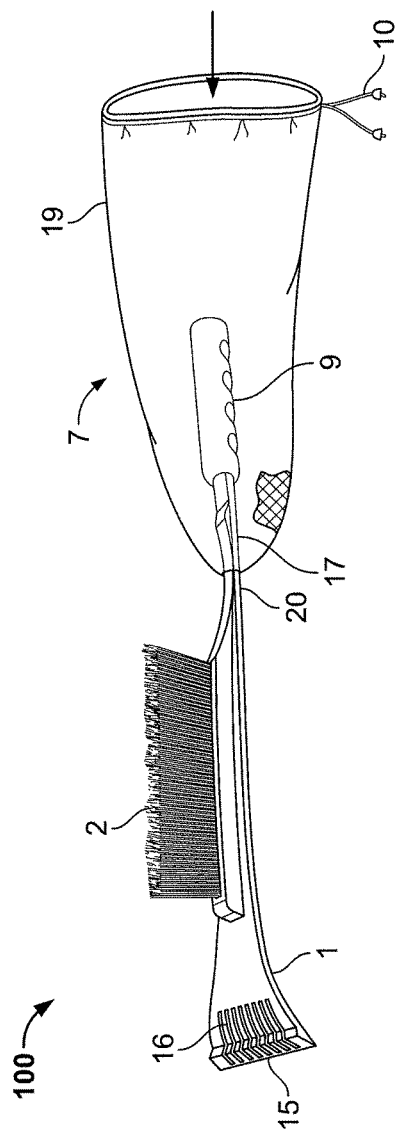
FIG. 1 shows a side view of the ice scraper and brush with the cover in its first position enclosing the handle grip.

FIG. 1 illustrates an ice scraper/brush combination 100. An ice scraper blade 1 is attached to a handle 17. Blade 1 has a beveled edge 15 with elevated ridges 16, which support the blade for breaking ice. A brush 2 is attached to the handle 17.

A cover 7 is secured to a handle neck 20. The handle 17 has an anatomically shaped grip 9.

The cover 7 comprises a sleeve 19, and is provided with drawstrings 10, which prevent entering of snow and ice into the cover. A first side (the outside surface in use as shown in FIG. 1) of the cover 7 is made out of waterproof material, to protect the user's hand inside. A second side of the cover 7 (the inside surface in FIG. 1) is made of a suitable thermo-insulating fabric, such as a fleece.

The cover 7 is shown in FIG. 1 in a first position, enclosing the handle grip 9.

FIG. 2 shows the scraper 100 with the sleeve 19 in its second position, having been pulled forward to expose the handle 17 and grip 9, and enclose the blade 1 and brush 2.

In FIG. 3, the drawstring 10 has been pulled tight to substantially seal the sleeve 19 around the blade 1 and brush 2 to substantially prevent release of water from the scraper 100 to the interior of the vehicle.

As noted above, the drawstring 10 may be replaced by hook-and-loop fastener strips or another suitable type of closure.

The scraper may include a blade, or a brush, or both. A different tool such as a squeegee could be included, in addition to or replacing the blade or the brush.

In some cases it may also be preferable to provide for ventilation of the sleeve when in its first and/or second position, either through an opening left open by the drawstring, or by another type of opening not shown, for the user's comfort, or to facilitate drying of the scraper/brush 100 after use.

Any suitable material can be used for the sleeve.

The structure of the handle and the handle neck is not critical. The handle, handle neck and grip could be integral, or assembled in any suitable way.

The sleeve can be secured to the handle neck in any suitable way and at any suitable position.

What is claimed is:

1. An ice scraper/brush comprising:
an elongate handle having opposed first and second ends with a grip extending from the second end, a scraper blade extending from the first end of the handle and extending across the axis of the handle, and an elongate brush extending along the handle axis between the scraper and the grip comprising a plurality of bristles extending transversely with respect to the handle axis, said brush being at a location along the handle axis defined between the scraper blade and the grip;
a sleeve-shaped cover having a first end attached to the handle at a point between the grip and the blade and brush,
the cover being configured and sized to be reversible between a first position enclosing the grip and a hand of a user holding the grip, and a second position exposing the grip and enclosing the blade and brush; and
wherein the cover further comprises a fastening arrangement configured for tightening around the user's hand in the first position, and for tightening around the scraper and brush in the second position, to protect the user's hand in the first position, and to substantially seal around the blade and brush in the second position.

2. An ice scraper/brush according to claim 1, wherein a first side of the cover is made out of waterproof material and a second side of the cover comprises a thermo-insulating material.

3. The device of claim 2, wherein in the second position, the waterproof material is disposed on the inside of the cover for a watertight enclosure of the ice scraper/brush.

4. The device of claim 1, wherein the fastening arrangement comprises a drawstring.

5. The device of claim 1, wherein the fastening arrangement comprises a hook-and-loop fastener.

6. A method of cleaning ice or snow from an object, comprising the steps of:

providing an ice scraper/brush according to claim 1;

covering a hand of the user with the sleeve-shaped cover;

cleaning the ice or snow with said blade and brush; and then reversing the cover between the first position enclosing the grip and the user's hand holding the grip, and the second position exposing the grip and enclosing the blade and brush, further comprising tightening the cover around the user's hand to protect the user's hand in the first position, and tightening the cover around the scraper and brush to substantially seal the scraper and brush in the second position, using the fastening arrangement.

7. The method of claim 6, wherein a first side of the cover is made out of waterproof material and a second side of the cover comprises a thermo-insulating material.

8. The method of claim 7, wherein in the second position, the waterproof material is disposed on the inside of the cover for a watertight enclosure of the scraper and brush.

9. The method of claim 6, wherein the fastening arrangement comprises a drawstring.

10. The method of claim 6, wherein the fastening arrangement comprises a hook-and-loop fastener.

* * * * *